June 28, 1955 — M. HALLEAD — 2,711,805
SINGLE-OPERATING DUAL BAYONET-TYPE TRACTOR HITCH
Filed Dec. 22, 1950
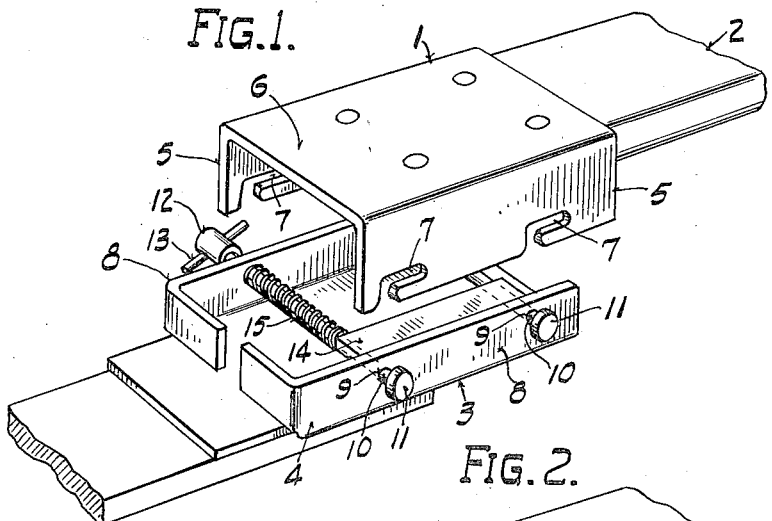
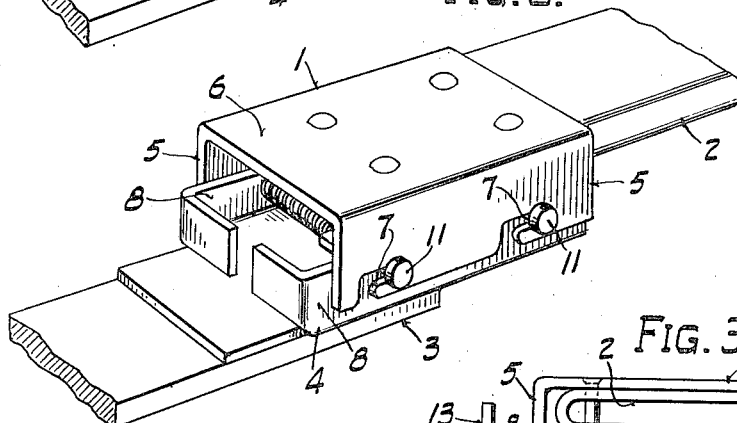
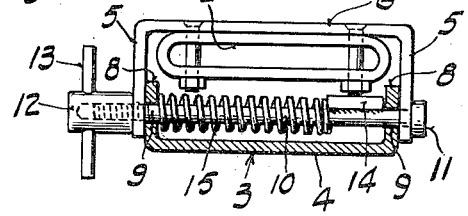
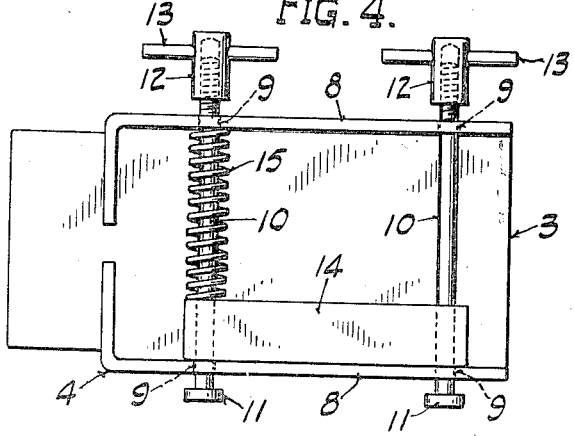
INVENTOR.
Mervil Hallead
BY Andrew & Seeler
ATTORNEYS.

2,711,805
Patented June 28, 1955

2,711,805

SINGLE-OPERATING DUAL BAYONET-TYPE TRACTOR HITCH

Mervil Hallead, Milwaukee, Wis., assignor to The Midland Company, South Milwaukee, Wis., a corporation of Wisconsin Application December 22, 1950, Serial No. 202,330

3 Claims. (Cl. 189—36)

This invention relates to tractor hitches of the type employed for removably securing selectively various implements such as lawn mowers, plows and the like to a garden tractor.

The invention provides means for holding one of the hitch members in an open position to receive the other member without being accidentally displaced and for securing the members together at both sides by a single operation on one side only.

A principal object of the invention is to provide a hitch requiring access to one side only thereof so that the operator attaching the implement can tighten the hitch without having to reach both sides of the tractor.

A further object is to provide such a hitch so that operating parts disposed adjacent one side thereof present no hazard in tightening the hitch from the other side.

Another object is to provide for opening of the hitch and securing the parts thereof in open position while the implement is being adjusted and mounted on the tractor.

A further object is to hold the parts against accidental displacement in moving the implement or the tractor into assembled relation with the other.

These and other objects and advantages will be more fully set forth in the following description of a preferred embodiment of the invention as illustrated in the accompanying drawing.

In the drawing:

Figure 1 is a perspective view of the two hitch members in position just prior to assembly;

Fig. 2 is a similar view showing the members assembled and secured together;

Fig. 3 is a vertical transverse section taken through the lower bar showing the forward end of the assembled hitch in elevation; and Fig. 4 is a plan view of the lower hitch member shown in Figs. 1 to 3 in open position to receive the other member shown in Figs. 1 to 3.

The hitch shown in the drawings comprises the upper member 1 which is generally carried by the forward frame 2 of the tractor, not otherwise shown, and the lower assembly 3 which includes the hitch carrier 4 of the implement, not shown.

Upper member 1 secured on frame 2 is channel shaped and disposed with the two sides 5 projecting downwardly and extending parallel with the direction of forward movement of the tractor. The web 6 of member 1 may be welded or otherwise secured to frame 2. The two slots 7 in each side 5 of member 1 are disposed and open to receive parts of assembly 3 as will be described. The slots 7 of each side are paired and disposed oppositely of each other.

The hitch carrier 4 comprises a channel member having parallel upstanding sides 8 which are spaced to fit fairly closed between sides 5 of member 1 and are provided with four holes 9 corresponding in position to the openings of the bayonet slots 7 in sides 5 of member 1.

The two bolts 10 mounted in corresponding holes 9 of carrier 4 extend transversely of the hitch with the heads 11 on the same side. The nuts 12 on the opposite side are mounted on the threaded ends of bolts 10 and include the pins 13 which adapt the nuts to be turned by hand for tightening as will be described.

The bar 14 welded to bolts 10 rigidly connects the bolts so that they are only movable together in either direction in holes 9 and additionally secures each bolt against turning as when tightening or loosening nuts 12. Bar 14 is disposed between sides 8 of carrier 4 and spaced a predetermined distance from the side 8 adjacent to bolt heads 11. The spring 15 mounted on either one of bolts 10 is disposed between the other side 8 of carrier 4 and bar 14. Spring 15 normally urges bar 14 towards and against the side 8 adjacent to heads 11 so that the heads 11 of bolts 10 are spaced from the corresponding side 8 the predetermined distance referred to above.

According to the invention, lower hitch assembly 3 is prepared for securing to upper member 1 by loosening nuts 12 of the two bolts 10. Each bolt 10 is of a length to allow the nut to be turned to allow spring 15 to move the bolts in holes 9 so that heads 11 are spaced as referred to above and so that the nuts are similarly spaced from the corresponding side 8 of carrier 4. The spacing provided on the outside of sides 8 of carrier 4 should be sufficient to receive the sides 5 of member 1 provided with the bayonet slots 7.

In making the hitch, the implement, not shown, including carrier 4 and the tractor carrying member 1 are maneuvered so that the portions of bolts 10 on opposite sides of carrier 4 are entered fully in slots 7 of member 1. Nuts 12 are then turned, drawing bolt heads 11 and the nuts tight against sides 5 of member 1 and sides 5 against sides 8 of carrier 4.

Spring 15 and bar 14 serve to hold bolts 10 in position to receive member 1 as the implement, or tractor, or both, are maneuvered into position. In any case, the parts are generally unwieldy and difficult to manage with the accuracy usually required to make the hitch. Hitches which include fixed studs with washers and nuts are invariably displaced and usually must be repositioned several times to receive the other member before the hitch is successfully completed.

The location of nuts 12 on one side of the hitch only allows the bolts to be tightened from that side only and eliminates the necessity of the operator's reaching or going around to the other side to complete the hitch.

Moving parts located close to the other side of the hitch present no hazard as where the hitch must be completed from both sides.

The lower assembly 3 of the hitch is adapted to be employed in association with implements for attachment to any existing tractors fitted with an upper member similar to member 1 and requires no alteration of such upper member where the same has been employed with other types of hitches.

Bolts 10 and bar 14 comprise a rigid unitary assembly of substantial weight and construction. The parallel arrangement of bolts 10 in holes 9 only permits one straight line movement of the assembly so that the vibration of the tractor will not displace the bolts even without spring 15.

Various embodiments of the invention may be employed within the scope of the following claims.

I claim:

1. A tractor hitch of the class described, comprising a pair of laterally spaced longitudinally disposed parallel vertical side plates constituting one hitch member having two corresponding pairs of slots therein to receive the other member, the other member constituting a carrier adapted to fit between said side plates and having opposite holes corresponding to the relative locations of said slots, bolts slidably carried crosswise in corresponding holes of said carrier having the heads on the same side thereof, a bar secured to said bolts securing the latter rigidly whereby the bolts are secured against turning and providing only unitary lengthwise movement within the holes of said carrier, spring means disposed to urge said bolts lengthwise in the direction spacing the heads thereof from said carrier to expose portions of the bolts on one side of the carrier, abutment means limiting the movement of said bolts in the last named direction, and means threaded on the corresponding opposite ends of said bolts for manual turning and tightening adapted to be moved by turning to expose corresponding portions of the bolts whereby said bolts are adapted to enter the slots of said first named hitch member and to be tightened thereagainst to secure said carrier between said side plates.

2. A tractor hitch of the class described, comprising a pair of laterally spaced longitudinally disposed parallel vertical side plates constituting one hitch member having two corresponding pairs of slots therein to receive the other member, the other member constituting a carrier adapted to fit between said side plates and having opposite holes corresponding to the relative locations of said slots, bolts slidably carried crosswise in corresponding holes of said carrier having the heads on the same side thereof, a bar secured to said bolts securing the latter rigidly whereby the bolts are secured against turning and restricting the same to only unitary lengthwise movement within the holes of said carrier, a spring disposed on one of said bolts between a part of said carrier and said bar to urge said bolts lengthwise in the direction spacing the heads thereof from said carrier to expose portions of the bolts on one side of the carrier, said bar being disposed to engage said carrier limiting the movement of said bolts in the last named direction, and means threaded on the corresponding opposite ends of said bolts for manual turning and tightening adapted to be moved by turning to expose corresponding portions of the bolts whereby portions of said bolts on each side of said carrier are adapted to enter the slots of said first named hitch member and to be tightened to secure said carrier between said side plates.

3. A hitch member of the class described adapted to fit between laterally spaced longitudinally disposed parallel plates having two corresponding pairs of slots, comprising a carrier channel having opposite sides and holes therein corresponding to the relative locations of said slots, bolts slidably carried crosswise in corresponding holes of said channel having the heads on the same side thereof, a bar within said channel securing said bolts rigidly whereby the bolts are fixed against turning and allowed only unitary lengthwise movement within the holes of said channel, said bar engaging said channel to limit the movement of said bolts in the direction spacing the heads thereof from said carrier channel to expose portions of the bolts on one side thereof, spring means between said bar and the other side of said channel disposed to urge said bolts lengthwise in the last named direction, and means threaded on the corresponding opposite ends of said bolts for manual turning to be moved in turning to expose corresponding portions of the bolts on each side of said channel to enter said slots and to tighten said plates against the sides of said channel.

References Cited in the file of this patent

UNITED STATES PATENTS

| | | |
|---|---|---|
| 2,368,290 | Donald | Jan. 30, 1945 |
| 2,421,172 | Ulrich et al. | May 27, 1947 |